J. Bryant,

Windlass,

№ 601, Reissued Sept. 21, 1858.

Inventor.
J. Bryant

UNITED STATES PATENT OFFICE.

JOEL BRYANT, OF BROOKLYN, NEW YORK.

HOISTING-WINCH FOR SHIPBOARD.

Specification forming part of Letters Patent No. 16,965, dated April 7, 1857; Reissued September 21, 1858, No. 601.

*To all whom it may concern:*

Be it known that I, JOEL BRYANT, of Brooklyn, in the county of Kings and State of New York, have invented a new and Improved Mode of Constructing Winches for Hoisting and Lowering the Sails and Cargo of Vessels on Shipboard; and I hereby declare that the following corrected and amended specification is a full and correct description thereof, to wit.

The nature of my invention consists in the construction of winches, whose bosses or drums—turned by cog-wheels—operate in connection with certain sheaves, wheels, or pulleys, for carrying and operating the fall or tackle, in hoisting or lowering the sails or cargo of vessels on shipboard; as also and, by the same means, that when the sails of the vessel are hoisted, and the vessel is "under way," that the said fall or tackle may be left standing and remaining upon the said bosses or drums—in connection with the said sheaves, wheels, or pulleys—ready at all times, to be cast off—for lowering and settling away of the sail in the same order in which it was hoisted, or for partly lowering the sail—making fast—and then hoisting again—as occasion may require, in squalls—for reefing, or for jibbing, &c.,—without the necessity (as in the use of other winches), of shifting the said fall or tackle to, and fro from the said bosses or drums, to the frame of the winch, or to the "fife rail" of the vessel, and vice versa from the said frame or "fife rail" back to the said bosses or drums, as, in other and ordinary winches—whenever the said sails are to be hoisted, or lowered, as by this arrangement the said fall or tackle, may remain upon the said bosses or drums, in connection with the said sheaves, wheels, or pulleys, as aforesaid—the said winches thus supporting the weight of the sails while the vessel is under way, and thereby affording a very desirable convenience, and a saving of time, and labor, on ship board, where, as is well known, delay is sometimes dangerous. And, also—in addition to the above-named advantages—and, by the use of cog-wheels (see surrendered schedule of additional improvements), important additional advantages in speed, or in power, are obtained in the use of my said winches, and—for the operation of the said fall or tackle, as aforesaid, so as that the said sails or cargo, may be more easily, and quickly hoisted, and more conveniently, and safely lowered and settled away than in the use of other winches—the said fall or tackle, with the weight, being more easily operated, and remaining more completely under the government and control of the operator.

Figure 1:
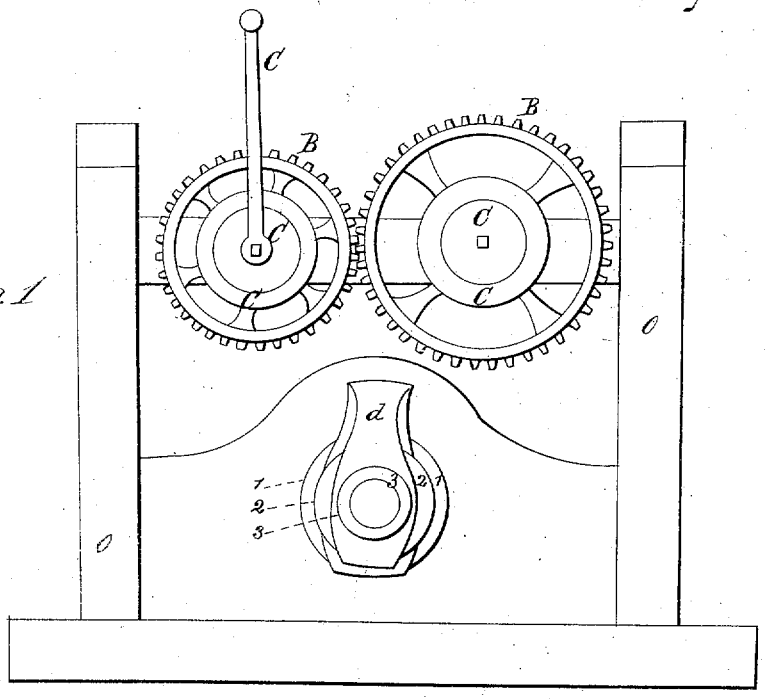
Figure 2:
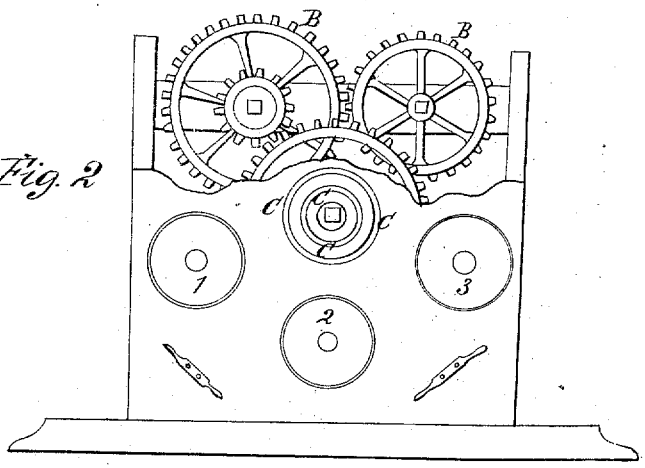

Te enable others skilled in the art to make and use my improved winches, I will proceed more fully to describe their construction and operation—reference being made to the accompanying drawings, and to the figures and letters marked thereon, and forming a part of this specification,—Figure 1, being a perspective view of one of my said winches, and is illustrative of the character and principle of my invention, as herein described.

I construct my improved winches (Fig. 1) with two or more bosses or drums C, turned by cog-wheels B, of varying sizes—operating in connection with each other for turning the said bosses or drums C, with different degrees of speed, and power, according to their varying sizes—upon the well-known principle of "virtual velocities,"—the said cog-wheels B, being set and secured upon the same axles with the said bosses or drums C, as set and secured in the frame O, of the said winches (Fig. 1). On the said frame O, and below the said bosses or drums C, I set and secure upon strong axles, within a block *d*, or in any other equivalent position—certain sheaves, wheels, or pulleys 1, 2, 3. The said sheaves, wheels, or pulleys, 1, 2, 3, are designed to act, and operate in connection with the said bosses or drums C, in carrying, operating, and sustaining the said fall or tackle used in hoisting or lowering the sails or cargo, and for sustaining the weight of the sail hoisted, when with the said fall or tackle remaining upon the winches, when the vessel is under way, so as at all times to be ready to be cast off, and to lower and settle away the said sail, with the fall or tackle remaining—and running upon the said sheaves, wheels, or pulleys, 1, 2, 3, in connection with the said bosses or drums C, as aforesaid, and thus affording a convenience, and safeguard, for the lowering and settling away of sails.

In the hoisting of sails or cargo upon my improved winches (Fig. 1), the fall or tackle is first applied to one of the said sheaves, wheels, or pulleys 1, 2, 3, and is then carried up and placed upon one of the said bosses or drums C, when—power being applied to the crank *e*, the sail or weight is turned up and hoisted with speed, or power—according as the application of the fall or tackle is made to the said bosses or drums C, which, as aforesaid, operate to carry the said fall or tackle with varying degrees of speed or power, as turned by the said cog-wheels B, of varying sizes.

In the construction and use of my said winches (Fig. 1), I do not confine myself to the exact description herein given, but in order to adapt my improved winches to general use, for different sized vessels—carrying different kinds, and sizes of sails, and cargo, I employ and use any desirable number of cog wheels B, bosses C, or sheaves, wheels, or pulleys 1, 2, 3, and set the same within or upon the frame O, of the said winches, in any desirable position, in order to adapt them to different sizes and classes of vessels, requiring the use of said winches.

It will be obvious, that in the use of my said winches, on board of vessels where very heavy articles of cargo are to be hoisted and lowered—that friction wheels, bars, and bands, may be required for safety and securely settling away of such heavy articles. I therefore, whenever it is desirable, use friction wheels, bars, or bands, in any of their known forms, in connection with my said winches.

And now, hereby disclaiming my original and surrendered Letters Patent, and all that is therein contained, I desire to secure by Letters Patent, what I herein claim as my invention as follows, to wit:

The construction and use of winches, whose bosses or drums—turned by cog-wheels—operate in connection with certain sheaves, wheels, or pulleys, for carrying, operating, and sustaining the fall or tackle, used in hoisting or lowering the sails or cargo of vessels on shipboard—substantially as herein described, and for the purposes set forth.

J. BRYANT.

Witnesses:
CHARLES LEECH,
MELVILLE BRYANT.

[FIRST PRINTED 1911.]